United States Patent [19]

Ohmae et al.

[11] Patent Number: 4,831,095

[45] Date of Patent: May 16, 1989

[54] NOVEL ETHYLENE COPOLYMER AND PROCESS FOR PRODUCING SAID COPOLYMER

[75] Inventors: Tadayuki Ohmae; Kentaro Mashita; Noboru Yamaguchi; Kouichiro Asao; Hisao Tanaka; Tadashi Sakurai, all of Chiba, Japan

[73] Assignee: Sumitomo Chemical Company, Limited, Osaka, Japan

[21] Appl. No.: 145,353

[22] Filed: Jan. 19, 1988

[30] Foreign Application Priority Data

Jan. 16, 1987 [JP] Japan .................................. 62-8386
Dec. 23, 1987 [JP] Japan .............................. 62-327724

[51] Int. Cl.$^4$ ............................................. C08F 20/60
[52] U.S. Cl. .................................................... 526/307
[58] Field of Search ........................................ 526/307

[56] References Cited

FOREIGN PATENT DOCUMENTS 22523 4/1942 Japan .
229904 11/1985 Japan .

Primary Examiner—Joseph L. Schofer
Assistant Examiner—N. Sarofim
Attorney, Agent, or Firm—Sughrue, Mion, Zinn, Macpeak & Seas

[57] ABSTRACT

A novel ethylene copolymer and a process for producing said copolymer are disclosed. This ethylene copolymer contains from 40 to 95% by weight of ethylene, from 60 to 5% by weight of at least one dialkylaminoalkyl acrylamide comonomer represented by formula (A):

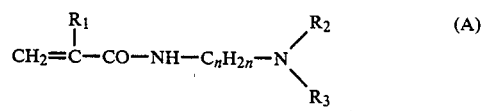

wherein the symbols are as defined in the appended claims, and 0 to 20% by weight of at least one ethylenically unsaturated comonomer, and has a number average molecular weight of from 5,000 to 50,000.

5 Claims, 3 Drawing Sheets

NOVEL ETHYLENE COPOLYMER AND PROCESS FOR PRODUCING SAID COPOLYMER

FIELD OF THE INVENTION

The present invention relates to a novel ethylene copolymer obtained by radical copolymerization of ethylene and an ethylenically unsaturated comonomer and a process for producing said copolymer. More particularly, it is concerned with a copolymer of ethylene and a dialkylaminoalkyl acrylamide copolymer and a process for producing said copolymer by a high-pressure radical copolymerization method.

The novel ethylene copolymer obtained by the present invention possesses characteristics which polyethylene inherently has, such as excellent moldability, low-temperature brittleness and flexibility, and further is superior in dyeability to polyethylene, has good compatibility with poly($\alpha$-olefins), and when formed in a quaternary salt, is capable of providing cationic electroconductive polymers excellent in film forming properties and electroconductivity.

Molded articles, such as fibers, sheets and films, as obtained from the novel ethylene copolymer of the present invention are excellent in the performance to absorb aqueous solutions of organic acids or inorganic acids and/or aqueous solutions of various metal salts.

As described above, the novel ethylene copolymer of the present invention has various functions and thus is expected to find various applications. In particular, it is expected to be used in the following two fields. That is, one is to use the ethylene copolymer as an additive to impart dyeability to poly($\alpha$-olefins), and the other is to use it as a starting material for electroconductive coating agents having excellent film forming properties and electroconductivity.

BACKGROUND OF THE INVENTION

The conventional technology in the above first application field of the novel ethylene copolymer of the present invention will hereinafter be explained.

Poly($\alpha$-olefins) such as polyethylene or polypropylene have excellent physical and mechanical properties and excellent processability, but since they are hydrophobic and chemically inactive, it is very difficult to dye fabricated articles of these polymers. In particular, crystalline polypropylene fibers have various features such that they are lightweight and strong and that they are good in heat retaining properties. Accordingly, at the initial development thereof, these fibers were expected to have wide applications for clothes, etc. as "dreamlike fibers", but since they have a serious fault that they cannot be dyed by an ordinary dyeing method, the fibers have now been used in limited use fields for, e.g., uncolored waddings, colored carpet pile yarns, and so on.

Accordingly, an improvement in dyeability of polypropylene fibers has hitherto been keenly demanded, and various methods have been proposed.

For example, a method of melt spinning a mixture of polypropylene and a material which can be a dyeing site for anionic dyes is realistic and is being watched with keen interest in the point that the characteristics which polypropylene inherently possesses, such as easy spinnability and yarn strength, are not reduced and the point that various kinds of dyes common to nylon yarns and wool can be applied thereto.

In particular, a copolymer of ethylene and a dialkylaminoalkyl acrylate comonomer represented by dimethylaminoethyl methacrylate, as described in Japanese Patent Publication No. 22523/67 is good in heat stability and can be very finely and uniformly dispersed in polypropylene by melt kneading and, hence, provides a dyeable poly($\alpha$-olefin) composition having excellent spinnability.

Also, Japanese Patent Application (OPI) Nos. 66646/73 and 41345/84 (the term "OPI" as used herein refers to a "published unexamined Japanese patent application") show dyeability improving effects of the aforesaid composition by adding thereto various kinds of metal salts of organic carboxylic acids.

On the other hand, in regard to the dyeing method, effects of various dyeing assistants and dyeing oils are shown in Japanese Patent Application (OPI) Nos. 154583/81, 154584/81, 133283/82, 149389/83, and 1786/84.

However, as the result of a number of trials for practical use made by the present inventors, it has been confirmed that in the case of dyeing fibers obtained by spinning various known dyeable polypropylene compositions containing a copolymer of ethylene and dialkylaminoalkyl acrylate comonomer as described above, using dyeing methods and equipments which are widely and normally used in the field of dyeing industry at present, the exhaustion speed of dye is low even by the above-described known improved dyeing methods and, hence, the dyeing time must be prolonged to an uneconomical extent.

For example, it has been found that when a tufted carpet made by using fibers obtained from the aforesaid dyeable polypropylene composition as pile yarns is subjected to wince dyeing at 95° C. using a dyeing bath acidified by acetic acid, in order to obtain a satisfactory dyeing exhaustion rate, the dipping time must be prolonged to an extent of from about 1.5 times to about 2 times that in the case of dyeing a tufted carpet made by using 6-nylon yarns or wool spun yarns of the same type. If the dipping time is shorter than the above-specified range, the dyeing properties are deficient to dye only the surface of yarns, whereby the dyed carpet becomes insufficient in various fastnesses such as washing resistance, light resistance, and rubbing resistance.

The conventional technology about the second application field of the novel ethylene copolymer of the present invention, that is, the electroconductive coating agent will hereinafter be explained.

Japanese Patent Application (OPI) No. 16542/72 discloses a cationic aqueous dispersion polymer as obtained by reacting a copolymer of ethylene and a dialkylaminoalkyl acrylate and an acid in water.

This aqueous dispersion is used as an electroconductive coating agent or antistatic agent for electrically insulating substrates such as paper or plastic films. The aqueous dispersion has the features that acceptability for inorganic fillers such as semi-conductors of metal oxides such as zinc oxide, tin oxide and titanium oxide is excellent, a coated film as obtained by coating on a substrate such as paper or plastic film and drying the coated substrate is semi-conductive, and flexibility, water resistance and solvent resistance are good.

The present inventors' investigation has confirmed that when an alkylolamine is added to an aqueous dispersion as obtained by the methods described in Japanese Patent Application (OPI) Nos. 98304/83 and 180697/83, that is, a method comprising converting a copolymer of ethylene and a dialkylaminoalkyl acrylate into a water-soluble quaternary salt in water and then addition reacting an epihalohydrin therewith, and the resulting mixture is heated, there is obtained a cationic aqueous dispersion capable of providing a coated film having a relatively low surface resistance over a wide humidity range.

Even when a coated film as obtained by coating and drying a cationic aqueous dispersion obtained using the above-described ethylene-dialkylaminoalkyl acrylate copolymer on a substrate such as paper and plastic film, the electroconductivity when the coated film is used as an electroconductive layer of electrostatic recording material is not sufficiently high. Particularly when the thickness of the coated film is as thin as about 1 μm, no satisfactory sharp recording pattern has been obtained.

SUMMARY OF THE INVENTION

An object of the present invention is to provide a novel ethylene copolymer and a process for producing said copolymer. The novel ethylene copolymer overcomes the aforementioned problems of the ethylene-dialkylaminoalkyl acrylate copolymer, makes it possible to produce poly(α-olefin) fibers exhibiting an exhaustion speed of dye nearly equal to those of nylon yarns and wool even at an earlier stage of the dyeing process, that is, in a relatively low temperature region, when used as a dyeability-improving agent, and markedly increases the electroconductivity of a coated film as obtained by coating on a substrate such as paper and plastic film when used as an electroconductive coating agent. Even when the thickness of the coated film is small, the coated film has a sufficiently low surface resistance and thus can be used as an electroconductive layer of electrostatic recording material.

The present invention relates to an ethylene copolymer containing from 40 to 95% by weight of ethylene, from 60 to 5% by weight of at least one dialkylaminoalkyl acrylamide comonomer represented by formula (A):

wherein $R_1$ is a hydrogen atom or a methyl group; $R_2$ and $R_3$ are each an alkyl group having from 1 to 4 carbon atoms; and n is an integer of from 2 to 5, and from 0 to 20% by weight of at least one ethylenically unsaturated comonomer, and having a number average molecular weight of from 5,000 to 50,000.

The present invention also relates to a process for producing an ethylene copolymer which comprises copolymerizing a mixture of from 40 to 99% by weight of ethylene, from 60 to 1% by weight of at least one dialkylaminoalkyl acrylamide comonomer represented by formula (A):

wherein $R_1$ is a hydrogen atom or a methyl group; $R_2$ and $R_3$ are each an alkyl group having from 1 to 4 carbon atoms; and n is an integer of from 2 to 5, and from 0 to 20% by weight of at least one ethylenically unsaturated comonomer in the presence of a radical polymerization initiator under a polymerization pressure of from 500 to 3,000 kg/cm$^2$ and at a polymerization temperature of from 100° to 300° C.

BRIEF DESCRIPTION OF THE DRAWINGS

| Tm | Tc | Copolymerization Composition |
|---|---|---|
| ○ | △ | Ethylene-dimethylaminopropyl acrylamide copolymer |
| ◐ | ▲ | Ethylene-dimethylaminoethyl methacrylate copolymer |
| □ | ■ | Low density polyethylene |

DETAILED DESCRIPTION OF THE INVENTION

Preferred examples of (A) the dialkylaminoalkyl acrylamide comonomer for the ethylene copolymer of the present invention are dimethylaminoethyl acrylamide, dimethylaminopropyl acrylamide, dimethylaminobutyl acrylamide, diethylaminoethyl acrylamide, diethylaminopropyl acrylamide, diethylaminobutyl acrylamide, di-n-propylaminoethyl acrylamide, di-n-propylaminopropyl acrylamide, di-n-propylaminobutyl acrylamide, N-(1,1-dimethyl-3-dimethylaminopropyl)-acrylamide, N-(2-methyl-3-dimethylaminopropyl)-acrylamide, and their corresponding methacrylamide derivatives.

Particularly preferred comonomers are dimethylaminopropyl acrylamide, dimethylaminopropyl methacrylamide, dimethylaminoethyl acrylamide, dimethylaminoethyl methacrylamide and the like.

Comonomers of formula (A) wherein n is 1 or 6 or more and/or $R_2$ and $R_3$ have 5 or more carbon atoms are not only relatively difficult to produce on a commercial scale and expensive, but also unstable or highly viscous under heated conditions. Thus they cannot be applied for the usual high-pressure ethylene polymerization process.

The polymerization unit of the dialkylaminoalkyl acrylamide comonomer in the ethylene copolymer of the present invention is from 60 to 5% by weight, preferably from 55 to 15% by weight, and more preferably from 50 to 20% by weight. If it is less than 5% by weight, the effect of improving the dyeability of the poly(α-olefin) composition is small, and when the copolymer is converted into a quaternary salt by reacting with an acid, it is poor in hydrophilicity and thus there cannot be obtained a stable aqueous dispersion containing uniform fine particles. On the other hand, if the polymerization unit of the dialkylaminoalkyl acrylamide comonomer is more than 60% by weight, the poly(α-olefin) composition using the resulting copolymer is not satisfactory in physical properties of yarn and also from an economic standpoint. When it is converted into a quaternary salt by reacting with an acid, hydrophilicity is too increased and thus not only the water resistance of a coated film is poor but also there cannot be obtained a tough coated film. Thus when used as an electroconductive layer of electrostatic recording material, problems arise in, for example, writing properties.

In producing the ethylene copolymer of the present invention, at least one other ethylenically unsaturated comonomer copolymerizable with ethylene can be used in combination, if necessary, for the purposes of, e.g., making it easy to continuously and stably feed the dialkylaminoalkyl acrylamide comonomer into the high pressure polymerization system by means of a pump. The polymerization unit of the ethylenically unsaturated comonomer to be used in the above case is from 0 to 20% by weight and preferably from 0 to 15% by weight. Preferred examples of the ethylenically unsaturated comonomer are methyl acrylate, ethyl acrylate, methyl methacrylate, vinyl acetate, dimethylaminoethyl methacrylate, dimethylaminoethyl acrylate and the like.

The number average molecular weight of the ethylene copolymer of the present invention as determined by comparing the peak count of a GPC chart measured using a tetrahydrofuran solution, with the peaks of the standard polystyrene having a known molecular weight is in the range of from 5,000 to 50,000 and preferably from 8,000 to 40,000. It is nearly equal to a melt index (determined according to JIS K-6760 at 190° C.) in the range of from 1,000 to 1 g/10 min. and preferably from 500 to 50 g/10 min.

If the molecular weight is in excess of 50,000, when the copolymer is mixed with a poly(α-olefin), compatibility is poor and spinnability is not good, and when the copolymer is converted into a quaternary salt by reacting with an acid, the resulting aqueous dispersion is poor in dispersibility and has an increased viscosity and thus when coated on a substrate such as paper or plastic film, a problem will arise. On the other hand, if it is less than 5,000, washing resistance of fibers of the poly(α-olefin) composition which have been dyed is poor, and when used as an electroconductive coating agent, the resulting coated film is poor in water resistance, solvent resistance, strength and so on.

The ethylene copolymer of the present invention can be produced by copolymerizing from 40 to 99% by weight of ethylene, from 60 to 1% by weight of a dialkylaminoalkyl acrylamide copolymer represented by formula (A) and from 0 to 20% by weight of at least one ethylenically unsaturated comonomer in the presence of a radical polymerization initiator under specified temperature and pressure conditions.

The copolymerization reaction for the production of the ethylene copolymer can be carried out under a polymerization pressure of from 500 to 3,000 kg/cm², with the range of from 700 to 2,500 kg/cm² being preferred. The copolymerization reaction can be carried out at a polymerization temperature of from 100° to 300° C., with the range of from 150° to 250° C. being preferred. If the polymerization pressure is less than 500 kg/cm² or the polymerization temperature is less than 100° C., the rate of polymerization and the conversion are markedly decreased in any case, and a large amount of a polymerization initiator is needed, which is disadvantageous from an industrial standpoint. Under higher pressures than 3,000 kg/cm² or at higher temperatures than 300° C., the polymerization operation becomes difficult and a stable operation cannot be expected.

As the polymerization method of the present invention, a batch system, a semi-continuous system, a continuous system and so on can be employed. A high-pressure continuous process is advantageous from an industrial standpoint.

The radical polymerization initiator to initiate the copolymerization reaction in the present invention means an initiator producing a radical under the polymerization condition employed, and includes oxygen, compounds containing an —O—O— bond or —N=N— bond, and so on. As such catalysts, oxygen, various organic peroxides, azo compounds, and so on are suitable. Particularly effective are peroxides and azo compounds represented by the following formulae:

wherein X is an aralkyl group or its derivative group, or an allyl group; Y is an allyl group or its derivative group, an aralkyl group, an alkyl group, or a hydrogen atom; and X and Y may be the same or different.

Specific examples are organic peroxides such as diethyl peroxide, tert-butyl hydroperoxide, di-tert-butyl peroxide, dicumyl peroxide, tert-butyl peroxylbenzoate, tert-butyl peroxyacetate, tert-butyl peroxy-2-ethylhexanoate, tert-butyl peroxypivarate, 2-ethylhexanoyl peroxide, pivaryl peroxide, isopropyl peroxydicarbonate and the like; azo compounds such as azobisisobutyronitrile, azobis-2,2-diphenylacetonitrile, 1-tert-butylazo-1-cyanocyclohexane, 2-tert-butylazo-2-cyanopropane, 2-tert-butylazo-2-cyanobutane and the like; and mixtures comprising two or more thereof.

The amount of the radical polymerization initiator used is in the range of from 5 to 3,000 parts by weight per 1,000,000 parts by weight of ethylene.

A chain transfer agent is used if necessary. For example, ethane, propane, propylene, butene-1, isobutene, hexane, heptane, methylcyclohexane, methanol and the like are particularly effectively used.

When the ethylene copolymer of the present invention is mixed with a poly(α-olefin), there can be obtained a poly(α-olefin) composition in which the above polymer components are uniformly mixed and which is free from phase separation and is greatly improved in dyeability and color fastness without deteriorating excellent physical or mechanical properties and mhydrofuran ooldability which the poly(α-olefin) inherently possesses.

When the ethylene copolymer of the present invention is mixed with a poly(α-olefin) exemplified by crystalline polypropylene, the ethylene copolymer is added generally in an amount of from 1 to 20 parts by weight per 100 parts by weight of the poly(α-olefin), with the range of from 2 to 10 parts by weight being preferred. If the amount of the ethylene copolymer added is less than 1 part by weight, dyeability is not sufficiently high. On the other hand, if it is more than 20 parts by weight, spinnability and characteristics of yarn are deteriorated.

To the poly(α-olefin) composition containing the novel ethylene copolymer of the present invention can be added, if necessary, various additives such as a heat stabilizer, an antioxidant, an ultraviolet degradation-preventing agent, an antistatic agent and a flame retardant, and further a small amount of an inorganic filler or pigment.

When the ethylene copolymer of the present invention is converted into a quaternary salt by reacting with hydrochloric acid in water, the resulting salt is addition reacted with epichlorohydrin to form an aqueous dispersion, and further an alkylolamine compound such as diethanolamine is added thereto and heated, there can be obtained a stable cationic aqueous dispersion which can provide a coated film having a low surface resistance over a wide humidity range.

When the above-described aqueous dispersion polymer is coated on a substrate such as paper or a plastic film and then dried, there is obtained a coated film which is good in transparency, has flexibility and is tough. The coated film exhibits great stability against moisture or water. Furthermore, when the above-described aqueous dispersion polymer is used as an electroconductive layer of electrostatic recording material, there is obtained an electrostatic recording material which is small in humidity dependence of recording density and is decreased in change of recording properties with a lapse of time. Furthermore, when the aqueous dispersion polymer is used as an antistatic agent, there is obtained a member which is excellent in maintenance of antistatic performance.

Articles such as fibers, sheets and films as obtained by heat molding the ethylene copolymer of the present invention are excellent in performance to absorb aqueous solutions of various organic acids and inorganic acids and/or those of metal salts and thus the ethylene copolymer of the present invention is expected to be applied to an ion exchange resin, a chelate resin and the like.

The present invention is described in greater detail with reference to the following examples.

EXAMPLE 1

In a 2-liter capacity stirring type autoclave type continuous reactor were continuously introduced, as shown in Table 1, 17.4 kg/hr of liquefied ethylene, 0.49 kg/hr of dimethylaminopropyl acrylamide (as an 80% by weight methanol solution), 2.5 g/hr of tert-butyl peroxypivarate (as a 2% by weight n-heptane solution) as a polymerization initiator, and 1.61 kg/hr of methylcyclohexane as a chain transfer agent, and a copolymer was produced under a polymerization pressure of 1,700 kg/cm$^2$ and at a polymerization temperature of 190° C.

The melt index (as determined by JIS K-6760 at 190° C.) of the ethylene copolymer as obtained above was 108 g/10 min. The dimethylaminopropyl acrylamide content as determined by an elemental analysis method was 18% by weight. The number average molecular weight as determined by the GPC method under the conditions shown below with polystyrene (manufactured by Toyo Soda Manufacturing Co., Ltd.) having a known molecular weight as a standard sample was 19,100.

Apparatus: Room temperature type GPC ("CCP&8000" manufactured by Toyo Soda Manufacturing Co., Ltd.)
Detector: Differential refractive indicator (DRI)
Column: TSK ® gel-G6000H, G4000H, G3000H, G2000H, and G1000H connected in series, manufactured by Toyo Soda Manufacturing Co., Ltd.
Temperature: 40° C.
Solvet: Tetrahydrofuran
Flow rate: 1.2 ml/min.
Amount of sample: 1 ml (polymer concentration 0.1 wt %)
Data processing: YHP-9825 manufactured by Yokokawa Hewlett Packard Co., Ltd.

EXAMPLES 2 to 8

Various ethylene copolymers were produced in the same manner as in Example 1 by the use of the same apparatus as in Example 1. Polymerization reaction conditions and characteristics (comonomer copolymerization content, melt index and number average molecular weight) of the ethylene copolymer obtained are shown in Table 1.

REFERENCE EXAMPLES 1 and 2

Poly(α-olefin) compositions were prepared using the ethylene copolymer of the present invention and their dyeability was evaluated. Dyeing of a fiber sample and the evaluation of dyeability and color fastness were carried out by the methods described below.

(1) Dyeing Method

Predetermined amounts of various dyes were dissolved in a dyeing bath (bath ratio=1:60) consisting of 2% owf of formic acid and 3% owf of dyeing aid, and Electrostripper ®-K (trade name for potassium alkyl phosphate produced by Kao Atlas Co., Ltd.) and heated up to 50° C. Various fiber samples each in an amount of 3 gr were dipped in the above dyeing bath. The temperature was raised at a rate of 1° C. per minute while applying upward and downward agitation. After the temperature reached 100° C. in 50 minutes, dyeing was continued for 30 minutes.

The dyed fiber sample was taken out, washed with water, subjected to soaping at 60° C. for 5 minutes in a soaping bath (bath ratio=1:60) containing 2 g/liter of Monogen ® (trade name for sodium salt of alkyl sulfate manufactured by Daiichi Kogyo Seiyaku Co., Ltd.), further washed with water and then dried.

(2) $DR_{70}$ (Dye exhaustion rate at 70° C.)

At the temperature-raising stage of the above dyeing method, when the bath temperature reached 70° C., the bath solution was taken in an amount of about 2 ml, and the residual dye concentration was measured by the colorimetric method and $DR_{70}$ was calculated. That is, assuming that the absorbance at the dye inherent absorption wavelength of the dye solution before dyeing is a and the absorbance of the bath solution sampled at 70° C. is b, the following equation is given:

$$DR_{70}=100\times(a-b)/a$$

(3) $DR_{100}$ (Final exhaustion rate at 100° C.)

Assuming that the absorbance at the dye inherent absorption wavelength of the bath solution after dyeing at 100° C. for 30 minutes is c, $DR_{100}$ is given as follows:

$$DR_{100}=100\times(a-c)/a$$

(4) FR (Final dyeing rate)

Assuming that the absorbance at the dye inherent absorption wavelength of the residual solution after soaping is d, FR is given by the following equation:

$$FR = DR_{100} 100d/a$$

(5) Light Fastness

Measured according to JIS L-0842.

The light source was carbon arc. The light fastness was determined by comparing the hue after irradiation at 63° C. for 80 hours with a blue scale. The rating was as follows: First class (worst) to Eighth class (best).

(6) Rubbing Fastness

Measured according to JIS L-0849.

After rubbing with wet cotton (JIS L-0803) 100 times at a frequency of 30 times per minute under a load of 200 gr, the rubbing fastness was determined. The rating was as follows: First class (worst) to Fifth class (best).

The fiber sample was prepared by the following method.

Predetermined amounts of three components, polypropylene shown in the footnote of Table 2, an ethylene copolymer EC-4 as obtained in Example 4, and an organic carboxylic acid sodium salt, were added and further mixed with 0.1 part by weight of Irganox® 1010 (trade name manufactured by Ciba Geigy Ag.) as a stabilizer and 0.5 part by weight of Sumisorb® 300 (trade name manufactured by Sumitomo Chemical Co., Ltd.) as an ultraviolet light absorbent by the use of a Henschel mixer. The resulting mixture was melt kneaded in an extruder having a diameter of 30 mm and composition pellets, DC-1 and DC-2, shown in Table 2 were obtained.

The pellets thus obtained were fed to a spinning machine comprising a 25 mm extruder (L/D=15) with a nozzle (number of holes: 12; diameter of hole: 0.8 mm) at the top of the extruder, and melt spinning was carried out under the conditions that the resin temperature was 240° C., the amount extruded was 1 kg/hr, and the winding speed was 450 m/min. The yarn was drawn to 3 times by running on a hot plate maintained at 110° C. to obtain a sample of multifilaments of 10 denier/filament.

The above operation was continued for 3 hours. In any of the compositions, no spinning trouble occurred at all and uniform multifilaments having a smooth surface and gloss were obtained.

The multifilament sample thus obtained was dyed in a formic acid-acidified bath using an acidic dye, Aminyl® Blue E-PRL (trade name of Sumitomo Chemical Co., Ltd.) and then subjected to soaping. As shown in Table 3, dyeability and color fastness were good and further DR70 was at a high level.

REFERENCE EXAMPLES 3 to 5

Dyeable compositions DC-3, DC-4 an DC-5 were prepared using polypropylene and an ethylene copolymer EC-5 or EC-8 in the same manner as in Reference Examples 1 and 2. Samples of multifilaments obtained by spinning and stretching in the same manner as in Reference Examples 1 and 2 were dyed and then subjected to soaping. The results were very satisfactory as shown in Table 3.

REFERENCE COMPARATIVE EXAMPLES 1 to 5

Various dyeable polypropylene compositions (RF-1 to RF-5) containing a copolymer of ethylene and dimethylaminoethyl methacrylate were prepared as shown in Table 2 by the same method as in Reference Examples 1 and 2, and also under the same conditions as in Reference Examples 1 and 2.

Each composition was spun and drawn under the same conditions as in Reference Examples 1 and 2 by the use of the same spinning machine as in Reference Examples 1 and 2 to prepare a sample of 12 multifilaments each of 10 denier/filament. This sample was subjected to the dyeing test as in Reference Examples 1 and 2 and the results are shown in Table 3.

In connection with spinnability, all the compositions were satisfactory, and also the filament quality was uniform and good. However, the value of $DR_{70}$ showing the dye exhaustion rate was considerably low as compared with the composition of Reference Examples 1 and 2 of the present invention, and furthermore the composition was inferior in final dyeing rate and color fastness to that of Reference Examples 1 and 2 of the present invention.

REFERENCE EXAMPLE 6

A cationic aqueous dispersion was prepared using the ethylene copolymer of the present invention. This dispersion was coated to form an electrostatic recording material, which was then evaluated for surface resistance and recording properties.

In a 1,000-milliliter glass flask were introduced, as shown in Table 4, 100 g of an ethylene copolymer, EC-4, 357 g of water and 26 g of 36% hydrochloric acid (corresponding to 100 mol parts per 100 mol parts of the amine group of the copolymer), and the resulting mixture was heated from ordinary temperature to 100° C. over 30 minutes while stirring and then stirred under reflux at 100° C. for 60 minutes. Subsequently, the reaction mixture was cooled to 80° C. while stirring, and 24 g of epichlorohydrin (corresponding to 100 mol parts per 100 mol parts of the amine group in the copolymer) was introduced and reacted for 5 hours. Further, at 80° C., 27 g of diethanolamine (corresponding to 100 mol parts of diethanolamine per 100 mol parts of the amine group in the copolymer) was introduced, and the resulting mixture was stirred for 5 hours to complete the reaction. The reaction mixture was cooled and then filtered by the use of a 200-mesh stainless steel net.

The reaction product obtained above was a pale brown and uniform aqueous dispersion in which the particle diameter was 0.1 micron or less. The pH was 6.9 and the viscosity was 17 cp (25° C.). The solids content as determined by evaporating moisture by heating at 100° C. was 30% by weight.

The aqueous dispersion was coated on a high quality paper (84 g/m$^2$) by the use of a #10 bar coater and dried at 100° C. for 5 minutes in a hot air circulation type drier to form a uniform coated film having a solid weight of 1.2 g/m$^2$ and freed from curling.

The surface electric resistance of the coated paper was measured by the use of a resistance-measuring meter (super insulation meter Model SM-10E manufactured by Toa Denpa Kogyo Co., Ltd.) under the conditions that the applied voltage was 100 V, the humidity was 30, 50 or 70% RH, and the temperature was 23° C. The surface electric resistance was $5 \times 10^7$, $8 \times 10^6$ and $9 \times 10^5$ Ω, respectively. On the other hand, the surface resistance of the paper before coating was $4 \times 10^{13}$ Ω at a humidity of 50% RH.

On the coated paper having a semi-conductive surface was coated a solution of 70 parts by weight of a coating agent for a dielectric layer (dielectric coating agent C manufactured by Sakata Shokai Co., Ltd.) and 30 parts by weight of calcium carbonate by the use of a #10 bar coater, which was then dried with air in a draft and then dried at 100° C. for 5 minutes in a hot air circulation type drier to obtain an electrostatic recording paper having a coated solids of 6.0 g/m².

This electrostatic recording paper was placed on an electrostatic recording tester (electrostatic printer EP101, AŌ type manufactured by Matsushita Denso Co., Ltd.) and an electrostatic recording test was performed at a humidity of 30% RH. A very sharp printed pattern was obtained.

REFERENCE EXAMPLES 7 and 8

Aqueous dispersions were prepared using ethylene copolymers, EC-4 and EC-6, in the same manner as in Reference Example 6. Also in the same manner as in Reference Example 6, the surface resistance was measured and the electrostatic recording test was conducted.

The results are shown in Table 4 along with those of Reference Example 6.

REFERENCE COMPARATIVE EXAMPLES 6 and 7

In the same manner as in Reference Example 6, a cationic aqueous dispersion was prepared, as shown in Table 4, using a copolymer of ethylene and dimethylaminoethyl methacrylate or dimethylaminoethyl acrylate as the starting material, the surface resistance was measured, and the electrostatic recording test was conducted. The results are shown in Table 4.

From the results of Table 4, it is apparent from both points of surface resistance and recording properties that the cationic aqueous dispersion using the ethylene-dialkylaminoalkyl acrylamide copolymer as the starting material is superior in performance as an electroconductive layer of electrostatic recording material to the cationic aqueous dispersion using the ethylene-dialkylaminoalkyl acrylate copolymer as the starting material.

REFERENCE EXAMPLE 9

With the ethylene-dimethylaminopropyl acrylamide copolymer, EC-4, as obtained in Example 4, absorption characteristics of various acid aqueous solutions and inorganic metal salt aqueous solutions were evaluated. The results are shown in Table 5.

The copolymer EC-4 was pelletized, heat pressed under conditions of 130° C. and 50 kg/cm² to form a sheet having a thickness of 0.5 mm, and a number of sample pieces each 2.5 cm in length and 4 cm in width were cut out from the sheet. The sample piece was soaked in 50 ml of each of various aqueous acid and inorganic metal salt solutions, having the concentration shown in Table 5, and stored for 4 hours at the temperature of 60° C. Then, the sample was taken out and after removing the attached solution on its surface with a filter paper, was measured the change in weight. An increase in weight was determined. In all the cases, even after absorption of the solution at a high rate, the shape of sheet was maintained.

REFERENCE COMPARATIVE EXAMPLE 8

With the same ethylene-dimethylaminoethyl methacrylate copolymer (E-1) as used in Reference Comparative Example 1, absorption characteristics of various acid aqueous solutions and inorganic metal salt aqueous solutions were measured. The results are shown in Table 5.

Although the ethylene copolymers EC-4 and E-1 were very similar in respect of the comonomer content and the average molecular weight, there are astonishing differences between them in respect of absorption characteristics of aqueous acid solutions and aqueous inorganic metal salt solutions. This great difference in the characteristics is considered to produce the dyeability imparting effect as demonstrated in Reference Example 1, etc. that the ethylene dialkylaminoalkyl acrylamide copolymer is much superior to the ethylene-dialkylaminoalkyl acrylate copolymer, and the performance as an electroconductive coating agent as demonstrated in Reference Example 6, etc.

REFERENCE EXAMPLE 10

Figure 1:
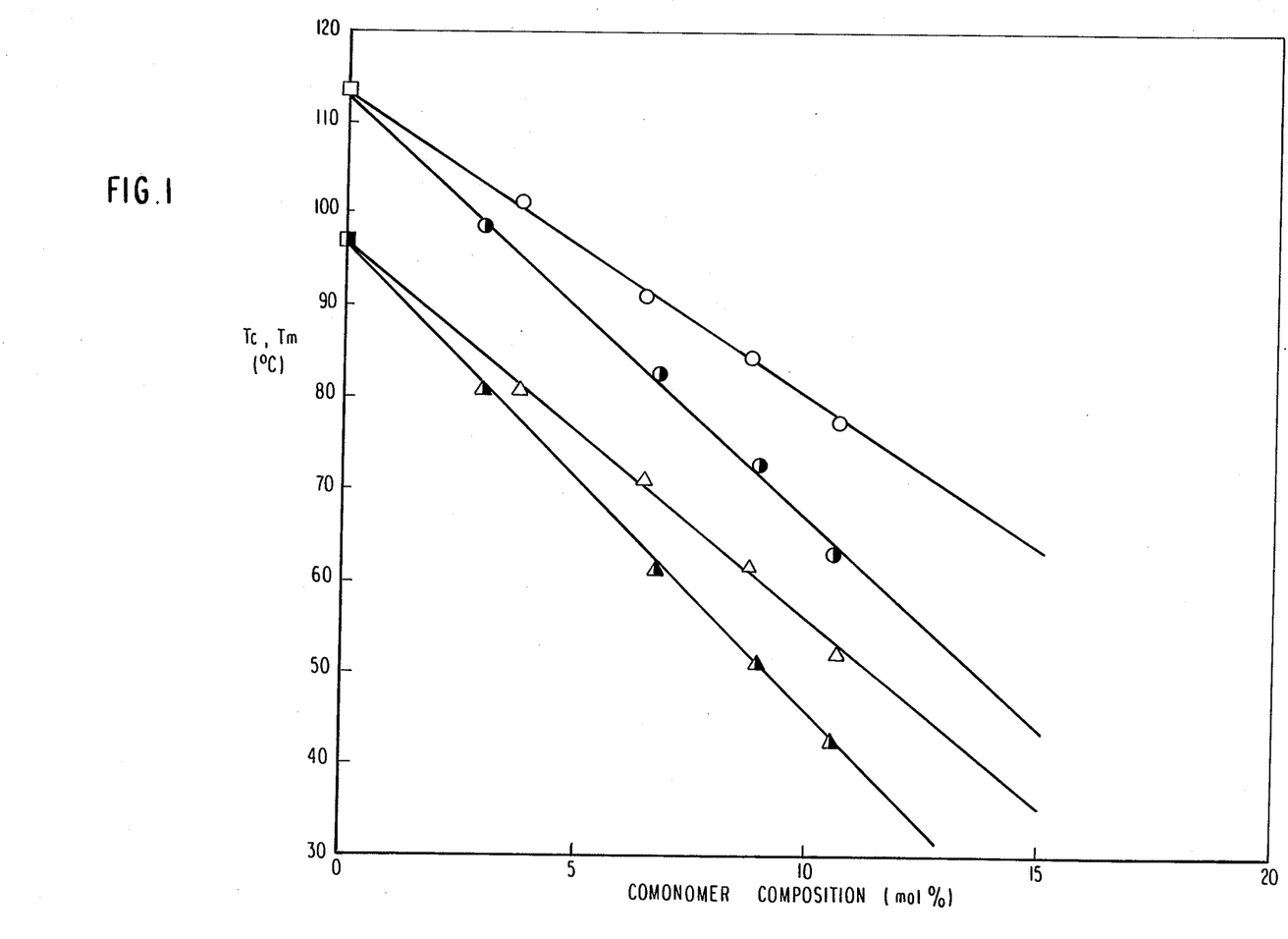
FIG. 1 shows a relation between copolymerization composition and thermal properties for the ethylene-dimethylaminopropyl acrylamide copolymer of the present invention and the prior art ethylene-dimethylaminoethyl methacrylate copolymer. The abscissa indicates a comonomer composition (mol %), and the ordinate indicates a crystallization temperature (Tc) and a melting point (Tm) as determined by the use of a differential scanning calorimeter (DSC). The value at the comonomer composition 0% is a value of low density polyethylene (Sumikathene ® G807 manufactured by Sumitomo Chemical Co., Ltd.).

An ethylene-dimethylaminopropyl acrylamide copolymer and an ethylene-dimethylaminoethyl methacrylate copolymer were measured for crystallization temperature (Tc) and melting point (Tm) by the use of a differential scanning calorimeter (DSC). It was found that there was a good linear relation between the mol content of each copolymer and Tc and Tm as illustrated in FIG. 1.

That is, assuming that the amount of each comonomer copolymerized is (M) (mol %), the relation can be indicated by the following formula.

Ethylene-dimethylaminopropyl acrylamide copolymer:

$$Tm = -3.3(M) + 113 \; (°C.)$$

$$Tc = -4.1(M) + 97 \; (°C.)$$

Ethylene-dimethylaminoethyl methacrylate copolymer:

$$Tm = -4.6(M) + 113 \; (°C.)$$

$$Tc = -5.1(M) + 97 \; (°C.)$$

It is astonishing that as compared at the same mol content, the ethylene-dimethylaminopropyl acrylamide copolymer is, as can be seen from FIG. 1, much higher in Tm and Tc than the ethylene-dimethylaminoethyl methacrylate copolymer. This cannot be explained only by the crystallization inhibiting effect of polyethylene main chain due to introduction of comonomer branches when it is taken into consideration that the molecular weights of both comonomers, that is, the sizes of the stereo structures are nearly equal. Accordingly this suggests that there is a substantial difference between the intramolecular or intermolecular mutual action mechanism of the amide bond and that of the ester bond.

This is supported by a great difference in characteristics of absorbing aqueous acid solutions or inorganic metal salt solutions between the above two ethylene copolymers as can be seen from Reference Example 9 and Reference Comparative Example 8.

REFERENCE EXAMPLE 11

Figure 2:
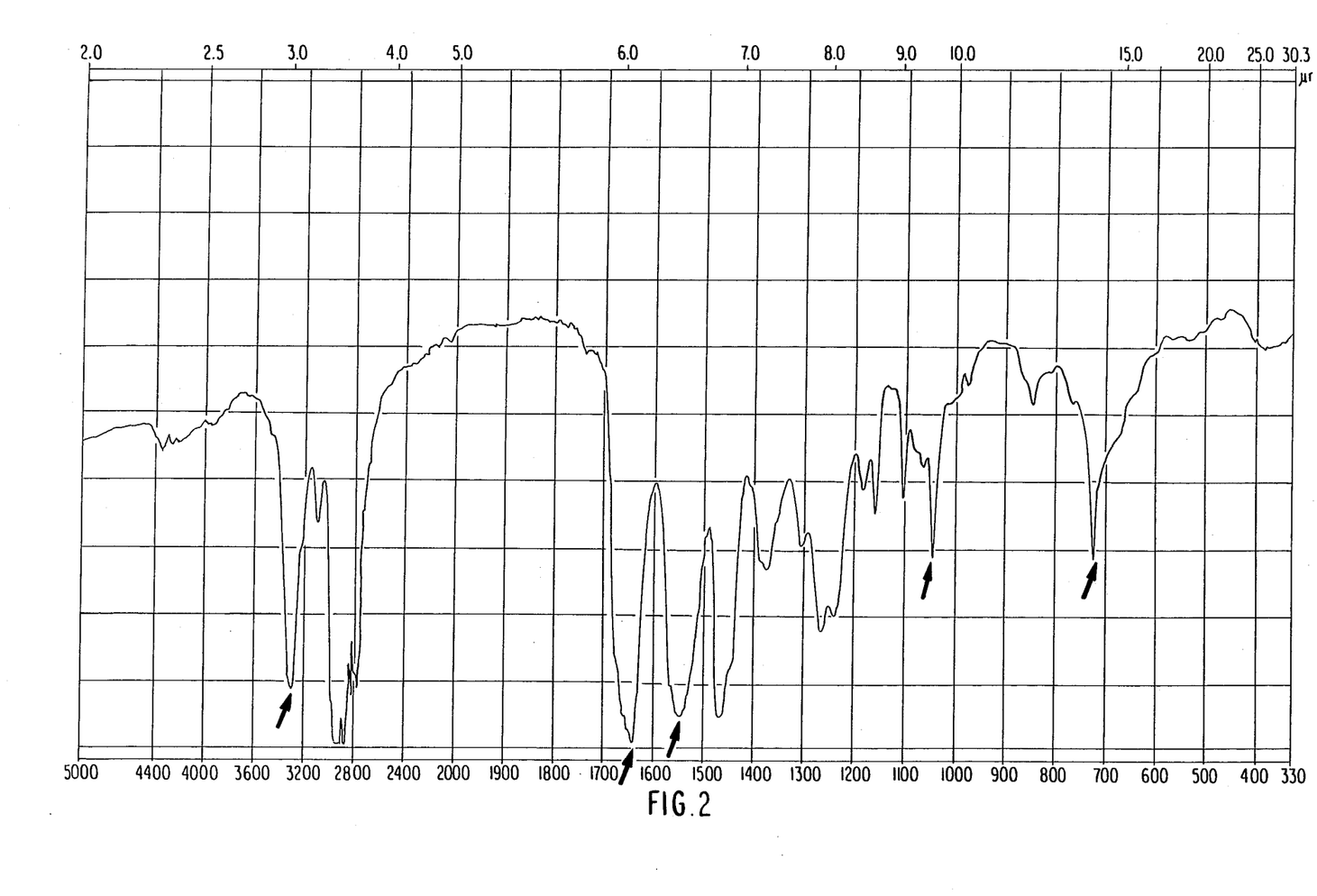
FIG. 2 is an infrared absorption spectrum of the ethylene-dimethylaminopropyl acrylamide copolymer of the present invention. The arrows indicate the positions of characteristic absorption peaks.
Figure 3:
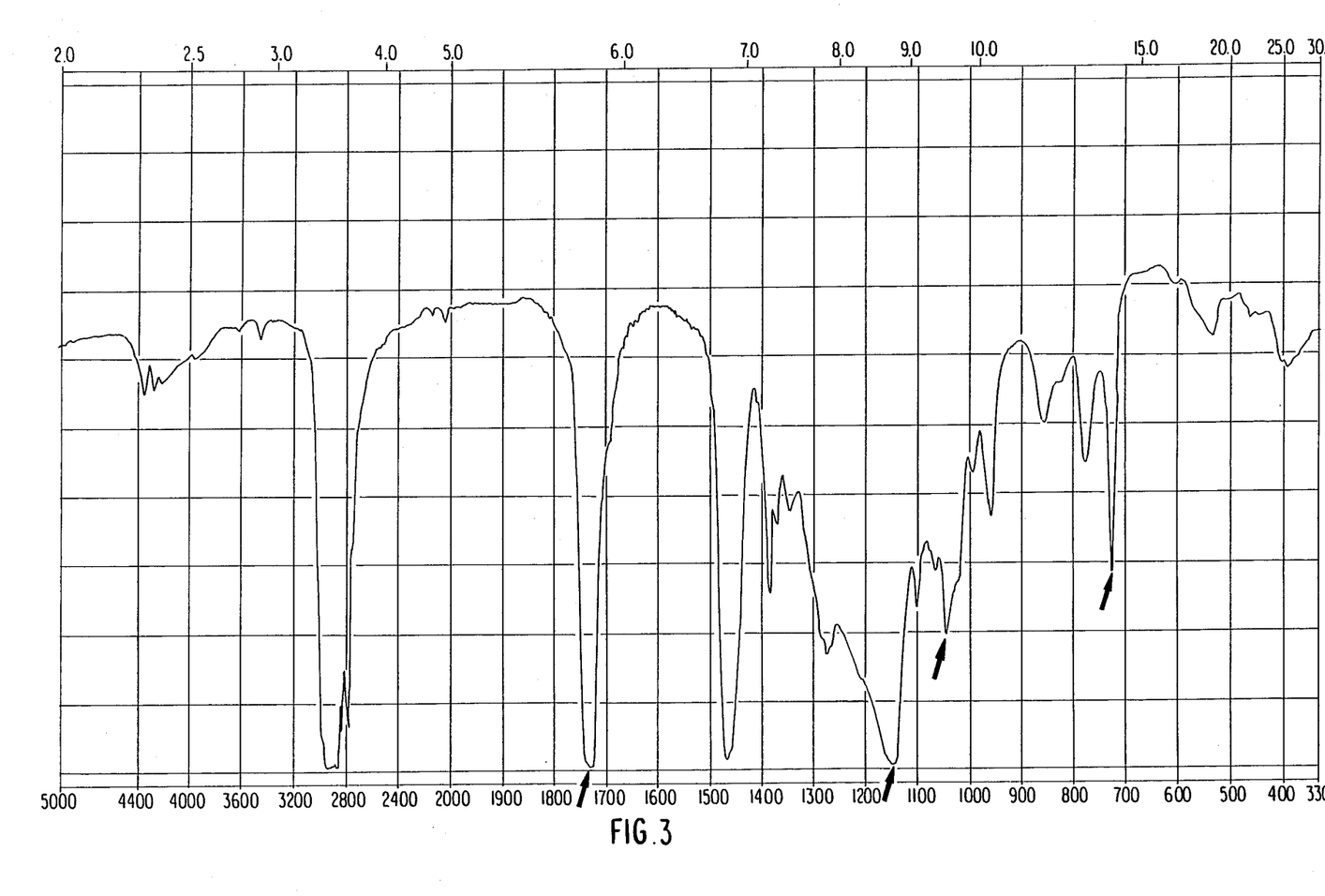
FIG. 3 is a infrared absorption spectrum of the ethylene-dimethylaminoethyl methacrylate copolymer of the prior art. The arrows indicate the position of characteristic absorption peaks.

The ethylene-dimethylaminopropyl acrylamide copolymer (EC-4) and the ethylene-dimethylaminoethyl methacrylate copolymer (E-1) were analyzed by the use of an infrared spectrophotometer. The infrared absorption spectra thus obtained are shown in FIGS. 2 and 3, respectively. The wave number and assignment of each characteristic absorption peak are shown in Table 6.

As shown in FIG. 2, the ethylene-dimethylaminopropyl acrylamide copolymer had characteristic absorptions, i.e., an amide I absorption band (1640 cm$^{-1}$) due to amide bond and an amide II absorption band (1550 cm$^{-1}$).

As shown in FIG. 3, the ethylene-dimethylaminoethyl methacrylate copolymer had characteristic absorptions, i.e., absorptions due to an ester bond (1730 cm$^{-1}$ and 1150 cm$^{-1}$).

TABLE 2

| Sample No. of Composition | Polypropylene (parts by weight) | Ethylene Copolymer (parts by weight) | Organic Carboxylic Acid Salt (parts by weight) |
|---|---|---|---|
| DC-1 | P-1 (95) | EC-4 (5) | — |
| DC-2 | P-1 (94) | EC-4 (5) | S-1 (1) |
| DC-3 | P-1 (93) | EC-5 (7) | — |
| DC-4 | P-1 (92.5) | EC-5 (7) | S-1 (0.5) |
| RF-1 | P-1 (95) | E-1 (5) | — |
| RF-2 | P-1 (94) | E-1 (5) | S-1 (1) |
| RF-3 | P-1 (93) | E-2 (7) | — |
| RF-4 | P-1 (92.5) | E-2 (7) | S-1 (0.5) |
| DC-5 | P-2 (96.5) | EC-8 (3.5) | — |
| RF-5 | P-2 (96.5) | E-3 (3.5) | — |

P-1: Noblen ® FL800 (trade name of polypropylene produced by Sumitomo Chemical Co., Ltd; homopolymer grade; MFI = 10 g/10 min. as determined by JIS K-6758), pellet form
E-1: 60/40 (by weight) (89.5/10/6 by mol) copolymer of ethylene and dimethylaminoethyl methacrylate (MFI = 360 g/10 min. as determined according to JIS K-6760), pellet form
E-2: 71/29 (by weight) (93.2/6.8 by mol) copolymer of ethylene and dimethylaminoethyl methacrylate (MFI = 100 g/10 min. as determined according to JIS K-6760),
pellet form
S-1: Sodium salt of a higher fatty acid mixture (5 parts by weight of sodium myristate, 30 parts by weight of sodium palmitate and 65 parts by weight of sodium stearate), flake form, containing 3 parts by weight of water
P-2: Noblen ® WF727R (trade name of polypropylene produced by Sumitomo Chemical Co., Ltd; random copolymer grade; ethylene content: 4 wt %; MFI = 30 as determined according to JIS K-6758), pellet form
E-3: 49/51 (by weight) (84.3/15.7 by mol) copolymer of ethylene and dimethylaminoethyl methacrylate (MFI = 160 g/10 min. as determined according to JIS K-6760), pellet form

TABLE 1

| | | Example 1 | Example 2 | Example 3 | Example 4 | Example 5 | Example 6 | Example 7 | Example 8 |
|---|---|---|---|---|---|---|---|---|---|
| Sample No. of Ethylene Copolymer | | EC-1 | EC-2 | EC-3 | EC-4 | EC-5 | EC-6 | EC-7 | EC-8 |
| Copolymerization Conditions | | | | | | | | | |
| Acrylamide Comonomer | Type | dimethylaminopropylacrylamide | dimethylaminopropylacrylamide | dimethylaminopropylacrylamide | dimethylaminopropylacrylamide | dimethylaminopropyl methacrylamide | dimethylaminopropyl methacrylamide | dimethylaminopropyl acrylamide | dimethylaminopropyl acrylamide |
| | Amount (kg/hr) | 0.49 | 0.99 | 1.49 | 1.54 | 1.01 | 1.45 | 1.02 | 1.71 |
| Ethylenically Unsaturated Comonomer | Type | — | — | — | — | — | — | MMA (1) | DAM (4) |
| | Amount (kg/hr) | — | — | — | — | — | — | 0.24 | 0.10 |
| Amount of Ethylene Supplied | (kg/hr) | 17.4 | 16.8 | 16.7 | 17.0 | 17.2 | 17.1 | 16.5 | 16.9 |
| Polymerization Pressure | (kg/cm$^2$) | 1700 | 1700 | 1700 | 1700 | 1700 | 1700 | 1700 | 1900 |
| Average Polymerization Temperature | (°C.) | 190 | 190 | 190 | 190 | 190 | 190 | 190 | 170 |
| Radical Polymerization Initiator | Type | TBPP (2) | TBPP | TBPP | TBPP | TBPP | TBPP | TBPP | TBPP |
| | Amount (g/hr) | 2.5 | 7.7 | 8.7 | 8.9 | 8.1 | 9.0 | 8.7 | 10.1 |
| Chain Transfer Agent | Type | methylcyclohexane | methylcyclohexane | methylcyclohexane | methylcyclohexane | methylcyclohexane | methylcyclohexane | methylcyclohexane | — |
| | Amount (kg/hr) | 1.61 | 1.52 | 1.19 | 1.37 | 1.50 | 1.21 | 1.61 | — |
| Results of Copolymerization | | | | | | | | | |
| Amount of Copolymer formed | (kg/hr) | 1.2 | 2.3 | 2.2 | 2.4 | 2.5 | 2.6 | 1.9 | 2.8 |
| Ethylene: Acrylamide Comonomer: Ethylenically Unsaturated Comonomer | (wt %) (mol %) | 82:18:0 96.2:3.8:0 | 72:28:0 93.5:6.5:0 | 65:35:0 91.2:8.9:0 | 60:40:0 89.3:10.7:0 | 72:28:0 94.0:6.0:0 | 61:39:0 90.5:9.5:0 | 58:32:10 87.2:8.6:4.2 | 50:45:5 84.8:13.7:1.5 |
| Melt Index (g/10 min) (3) | | 108 | 102 | 280 | 310 | 96 | 267 | 415 | 52 |
| Number Average Molecular Weight (GPC method) | | 19,100 | 17,800 | 13,200 | 10,200 | 22,600 | 11,500 | 10,100 | 31,500 |

(1) MMA: Methyl methacrylate
(2) TBPP: Tert-butyl peroxypivarate (2 wt % n-heptane solution)
(3) According to JIS K-6760 (190° C.)
(4) DAM: Dimethylaminoethyl methacrylate

TABLE 3

| | Yarn Material Composition | Name of Dye Trade Name | C.I. No. Acid | Dye Concentration (%, owf) | Acid (2%, owf) | Dyeability DR$_{70}$ | Dyeability DR$_{100}$ | FR | Light Fastness (Class) | Rubbing Fastness (Class) |
|---|---|---|---|---|---|---|---|---|---|---|
| Reference Example 1 | DC-1 | Aminyl ® Blue E-PRL | Blue 129 | 1.1 | formic acid | 69 | 95 | 82 | 6 | 5 |
| Reference Example 2 | DC-2 | Aminyl ® Blue E-PRL | " | " | " | 78 | 99 | 87 | 6–7 | 5 |
| Reference Example 3 | DC-3 | Aminyl ® Blue E-PRL | " | " | " | 72 | 94 | 81 | 6 | 4–5 |
| Reference Example 4 | DC-4 | Aminyl ® Blue E-PRL | " | " | " | 75 | 98 | 88 | 6 | 5 |
| Reference Comparative Example 1 | RF-1 | Aminyl ® Blue E-PRL | " | " | " | 34 | 87 | 69 | 5 | 4 |
| Reference Comparative Example 2 | RF-2 | Aminyl ® Blue E-PRL | " | " | " | 41 | 94 | 75 | 5 | 4 |
| Reference Comparative Example 3 | RF-3 | Aminyl ® Blue E-PRL | " | " | " | 32 | 85 | 61 | 4–5 | 4 |
| Reference Comparative Example 4 | RF-4 | Aminyl ® Blue E-PRL | " | " | " | 53 | 96 | 80 | 5 | 5 |
| Reference Example 5 | DC-5 | Lanyl ® Red GG | Red 211 | 2.0 | acetic acid | 67 | 95 | 83 | 6 | 4–5 |
| Reference Comparative Example 5 | RF-5 | Lanyl ® Red GG | " | " | " | 37 | 82 | 66 | 3 | 3 |

(1) Aminyl ®: Acidic dye (produced by Sumitomo Chemical Co., Ltd.)
(2) Lanyl ®: Premetallized acidic dye (produced by Sumitomo Chemical Co., Ltd.)

TABLE 4

| | | Ethylene Copolymer | | | Amount of Hydrochloric acid added (mol ratio to amine group) | Reaction Epihalohydrin | | Reaction Alkylolamine | |
|---|---|---|---|---|---|---|---|---|---|
| Sample No. | | Acrylamide Comonomer Type | Content (wt %) | MFI (g/10 min) | | Type | Mol Ratio to amino group | Type | Mol Ratio to amino group |
| Reference Example 6 | EC-4 | Dimethylaminopropyl acrylamide | 40 | 310 | 1.0 | Epichlorohydrin | 1.0 | Diethanolamine | 1.0 |
| Reference Example 7 | " | Dimethylaminopropyl acrylamide | 40 | 310 | " | Epichlorohydrin | " | Monoethanolamine | " |
| Reference Example 8 | EC-6 | Dimethylaminopropyl methacrylamide | 39 | 267 | " | Epichlorohydrin | " | Diethanolamine | " |
| Comparative Reference Example 6 | — | Dimethylaminoethyl methacrylate | 39 | 300 | " | Epichlorohydrin | " | Diethanolamine | " |
| Comparative Reference Example 7 | — | Dimethylaminoethyl acrylate | 35 | 250 | " | Epichlorohydrin | " | Diethanolamine | " |

| | | Reaction Product | | | Evaluation of Coating of High Quality Paper | | | | |
|---|---|---|---|---|---|---|---|---|---|
| Sample No. | | Solids content (wt %) | Viscosity 25° C. (cp) | Uniformity | Coated Amount (g/m$^2$) | Surface Resistance (Ω) 30% RH | 50% RH | 70% RH | Recording Properties 30% RH |
| Reference Example 6 | EC-4 | 30 | 17 | good | 1.2 | $5 \times 10^7$ | $8 \times 10^6$ | $9 \times 10^5$ | good |
| Reference Example 7 | " | 25 | 32 | good | 1.0 | $7 \times 10^7$ | $1 \times 10^7$ | $2 \times 10^6$ | good |
| Reference Example 8 | EC-6 | 25 | 20 | good | 1.3 | $6 \times 10^7$ | $9 \times 10^6$ | $1 \times 10^6$ | good |
| Comparative | — | 30 | 9 | good | 1.2 | $4 \times 10^8$ | $5 \times 10^7$ | $6 \times 10^6$ | bad |

TABLE 4-continued

| | | | | | | | | | |
|---|---|---|---|---|---|---|---|---|---|
| Reference Example 6 | | | | | | | | | |
| Comparative Reference Example 7 | — | 25 | 52 | good | 1.0 | $5 \times 10^8$ | $6 \times 10^7$ | $7 \times 10^6$ | bad |

TABLE 5

| | | | Reference Example 9 | Comparative Reference Example 8 |
|---|---|---|---|---|
| Ethylene Copolymer | Sample No. | | EC-4 | E-1 |
| | Type | | Dimethyl-aminopropyl acrylamide | Dimethyl-ethyl methacrylate |
| | Copolymerization Ratio (wt %) | | 40 | 40 |
| | Copolymerization Ratio (mol %) | | 11 | 11 |
| | Melt Index (g/10 min.) | | 310 | 360 |
| | Number Average Molecular Weight (GPC method) | | 10,200 | 10,100 |
| Aqueous Acid Solution Absorbing Characteristics (Rate of Increase in Weight) | Type of Acid | Concentration (wt %) | | |
| | Hydrochloric acid | 5 | 2.9 | 1.4 |
| | Sulfuric acid | 30 | 4.1 | 1.9 |
| | Nitric acid | 9 | 2.8 | 1.2 |
| | Phosphoric acid | 14 | 5.3 | 1.8 |
| | Boric acid | 9 | 17.5 | 1.0 |
| | Formic acid | 7 | 11.2 | 4.3 |
| Aqueous Metal Salt Solution Absorbing Characteristics (Rate of Increase in Weight) | Type of Metal Salt | Concentration (wt %) | | |
| | $FeCl_3$ | 1 | 3.5 | 1.1 |
| | $CoCl_2$ | 1 | 2.8 | 1.0 |
| | $CoSO_4$ | 1 | 3.2 | 1.0 |

Dipping conditions: 60° C., 4 hours
Rate of Increase in Weight:
Weight of sample after dipping/weight of sample before dipping

TABLE 6

| | Ethylene Copolymer | | | | |
|---|---|---|---|---|---|
| Sample No. | Type of Comonomer | Content (wt %) | MFI (g/10 min) | Wave Number (cm$^{-1}$) | Assignment |
| EC-4 | Dimethyl-aminopropyl acrylamide | 40 | 310 | 3300 | N—H Stretching (amide) |
| | | | | 3080 | |
| | | | | 1640 | C=O Stretching (amide I absorption band) |
| | | | | 1550 | N—H (amide II absorption band) |
| | | | | 1045 | C—N Stretching (amine) |
| E-1 | Dimethyl-ethyl methylacrylate | 40 | 360 | 1730 | C=O Stretching (ester) |
| | | | | 1150 | C—O Stretching (ester) |
| | | | | 1050 | C—N Stretching (amine) |

As described above, the novel ethylene-dialkylaminoalkyl acrylamide copolymer of the present invention, when mixed with a poly(α-olefin) provides a poly(α-olefin) composition having excellent dyeability. Furthermore, the copolymer of the present invention can be used as a starting material of an aqueous dispersion to produce a greatly increased electroconductive coated layer if the aqueous dispersion is coated on a substrate such as a paper or a plastic film and dried. This coated layer can be used as an electroconductive layer of electrostatic recording material.

While the invention has been described in detail and with reference to specific embodiments thereof, it will be apparent to one skilled in the art that various changes and modifications can be made therein without departing from the spirit and scope thereof.

What is claimed is:

1. An ethylene copolymer comprising from 40 to 95% by weight of ethylene, from 60 to 5% by weight of at least one dialkylaminoalkyl acrylamide comonomer represented by formula (A):

wherein $R_1$ is a hydrogen atom or a methyl group; $R_2$ and $R_3$ are each an alkyl group having from 1 to 4 carbon atoms; and n is an integer of from 2 to 5, and from 0 to 20% by weight of at least one ethylenically unsaturated comonomer, and having a number average molecular weight of from 5,000 to 50,000, which is produced by a process comprising copolymerizing from 40 to 99% by weight of ethylene, from 60 to 1% by weight of at least one dialkylaminoalkyl acrylamide comonomer represented by formula (A) and from 0 to 20% by weight of at least one ethylenically unsaturated comonomer in the presence of a radical polymerization initiator under conditions of polymerization pressure of from 500 to 3,000 kg/cm² and polymerization temperature of from 100° to 300° C.

2. An ethylene copolymer as claimed in claim 1, wherein the dialkylaminoalkyl acrylamide comonomer is at least one of dimethylaminopropyl acrylamide, dimethylaminopropyl methacrylamide, dimethylaminoethyl acrylamide and dimethylaminoethyl methacrylamide.

3. An ethylene copolymer as claimed in claim 1, wherein the ethylenically unsaturated comonomer is at least one of methyl acrylate, ethyl acrylate, methyl methacrylate, vinyl acetate, dimethylaminoethyl methacrylate and dimethylaminoethyl acrylate.

4. An ethylene copolymer as claimed in claim 2, wherein the dialkylaminoalkyl acrylamide comonomer is dimethylaminopropyl acrylamide.

5. An ethylene copolymer as claimed in claim 4, wherein when the content of the dimethylaminopropyl acrylamide comonomer is expressed by M (mol %), the melting point (Tm) and the crystallization temperature (Tc) of the copolymer are in the following relation:

$Tm = 3.3(M) + 113$ (°C.)

$Tc = 4.1(M) + 97$ (°C.).

* * * * *